United States Patent [19]

Tosima et al.

[11] Patent Number: 4,477,892

[45] Date of Patent: Oct. 16, 1984

[54] SURFACE ACOUSTIC WAVE DEVICE HAVING A PYRAMID SHAPED TIP FOR RECORDING VIDEO INFORMATION ON A SUBSTRATE

[75] Inventors: Soitiro Tosima; Masayoshi Nishikawa, both of Machida, Japan

[73] Assignee: RCA Corporation, New York, N.Y.

[21] Appl. No.: 397,895

[22] Filed: Jul. 13, 1982

[51] Int. Cl.³ .......................... G11B 3/44; H04R 17/04
[52] U.S. Cl. ..................... 369/132; 369/173; 310/313 R; 310/334
[58] Field of Search ............... 369/132, 133, 173, 135; 310/313 R, 334, 335

[56] References Cited

U.S. PATENT DOCUMENTS 3,842,194 10/1974 Clemens .
4,035,590 7/1977 Halter .
4,281,407 7/1981 Tosima .................. 369/130
4,434,481 2/1984 Toda et al. .
4,453,242 6/1984 Toda .

Primary Examiner—Donald E. McElheny, Jr.
Attorney, Agent, or Firm—E. M. Whitacre; P. J. Rasmussen; R. G. Coalter

[57] ABSTRACT

A surface acoustic wave recording device is constructed for use in recording video signals in the surface of a master substrate. The device includes a pyramidal-shaped tip having a plurality of transducer electrodes for launching surface acoustic waves on the surfaces of the device structure. Surface acoustic waves launched from the plurality of transducers are focused at the apex of the record device. A stylus, for example, of diamond, affixed to the apex of the pyramidal structure vibrates in consonance with the signal to be recorded to cut the video signals into the surface of the master substrate.

10 Claims, 7 Drawing Figures

SURFACE ACOUSTIC WAVE DEVICE HAVING A PYRAMID SHAPED TIP FOR RECORDING VIDEO INFORMATION ON A SUBSTRATE

The present invention relates generally to surface acoustic wave devices and, more particularly, to surface acoustic wave devices for recording high density information on a record medium.

A variety of approaches for recording information into a record medium exists in the prior art. For example, laser beam and electron beam techniques are described wherein the information is recorded into a photoresist, or the like, layer which is formed on the top surface of a record medium. Further, electromechanical processes are described where a diamond stylus driven by a piezoelectric element is used to cut a relief pattern representative of the recorded information into the top surface of a record medium.

Although it has been shown that optical and electron beam techniques provide good results in producing disc records, these techniques have certain drawbacks. In the case of electron beam recording, for example, the recording operation must be performed in a controlled environment, i.e., a vacuum, which makes the mastering operation more difficult. Another problem results from the use of a photoresist or similar medium for the recording layer. The photoresist coating requires careful processing to maintain a uniform coating across the surface of the record medium. Further the photoresist coating requires several processing steps. First, the surface of the record medium must be prepared, second, the photoresist must be coated on the prepared surface with a uniform thickness, third, the record medium must be exposed with the laser beam or electron beam and, fourth, the exposed areas of the photoresist must be removed to finally provide a surface that may be replicated.

An electromechanical recording technique for recording video signals in a metal master is described in U.S. Pat. No. 4,035,590 issued to J. B. Halter on July 12, 1977, entitled, "Apparatus for Electromechanical Recording of Short Wavelength Modulation in a Metal Master". According to Halter an unheated cutting stylus (e.g., of diamond) is positioned in a recording position with respect to a metal master to cut a groove having quiescent groove depth. The stylus is driven by a piezoelectric element driven by a signal source which is to be recorded on the surface of the metal master.

In one preferred electromechanical recording technique a thin plate of piezoelectric ceramic vibrates in the thickness mode and a diamond stylus affixed to the ceramic plate cuts into the surface of a copper master. The bandwidth of the video signal to be recorded is approximately 10 MHz. To accommodate this bandwidth the size of the cutterhead including the piezoelectric element and stylus must be very small. For example, a cutterhead designed to cut video signals at half a real time rate will have length and width dimensions for the combination of the stylus and the piezoelectric element of roughly 200 micrometers. At real time the wavelength of the signal to be recorded becomes so short that the cutterhead must be dimensioned at approximately one-half of the aforementioned dimensions. For this reason it is difficult to make an electromechanical cutterhead for cutting video signals at real time. First of all a smaller cutterhead is difficult to construct. Further, with respect to a real time cutterhead, the maximum voltage which is supplied to the cutterhead should be reduced because excessive heating may lead to thermal breakdown and depolarization of the piezoelectric element. To produce the vibration amplitudes necessary for video discs the signal voltage, in general, must be maintained at the voltage for half rate even if the thickness of the ceramic is reduced for the real time design. This is required because the vibrational amplitude is not proportional to the electric field but to the voltage applied. Therefore, the real time device may suffer depolarization or thermal runaway due to the high field applied to the small device.

Recently, it has been demonstrated that video disc type records may be mastered using a stylus structure wherein surface acoustic waves, rather than bulk waves, effect the cutting action of the stylus tip. In U.S. Pat. No. 4,281,407 issued to S. Tosima on July 28, 1981, entitled "Surface Acoustic Wave Pick-up and Recording Device" a surface acoustic wave device is disclosed having a substrate tapered to a tip at one end. A fan-shaped interdigital electrode structure having curved fingers is formed on the tip thereof. In the record mode the stylus is brought into contact with the record medium and power is applied to the interdigital electrode. A deformation of the surface of the record medium representative of the information is effected by the stylus tip during the recording operation. Although the Tosima structure may be useful for recording signal information into a surface of the record medium it has certain limitations which may affect the recording operation. For example, the bandwidth of the signal which may be recorded with a Tosima structure is a function of the number of interdigital electrode finger pairs arranged on the surface of the stylus. Further, signal reflections from the stylus tip may affect the operation of the cutterhead. Additionally, the surface acoustic wave power that can be generated at the tip of the stylus may be limited due to the geometry of the structure. For example, in the Tosima structure the number of electrode pairs that may be physically positioned on the stylus tip is limited.

The present invention overcomes the problems of the prior art by providing a surface acoustic wave device which may be used for real time recording of video signals in a record medium.

In accordance with the principles of the present invention a surface acoustic wave device is provided for use in recording information in the form of surface variations in a record medium. The device comprises a support having a pyramidal-shaped tip on one end thereof. The support has a longitudinal axis. The pyramidal-shaped tip includes a plurality of triangular-shaped surfaces meeting at the apex of the pyramidal shape. In operation the triangular-shaped surfaces are capable of supporting the propagation of surface acoustic waves. The device further includes first and second fan-shaped electrodes. The first fan-shaped electrode is formed on a first surface of the plurality of triangular-shaped surfaces. The first fan-shaped electrode is coupled to a signal source and provided for launching surface acoustic waves on the first surface. The surface acoustic waves launched from the first fan-shaped electrode in a first direction are focused at the apex of the pyramid. The second fan-shaped electrode is formed on a second surface of the plurality of triangular-shaped surfaces. The second fan-shaped electrode is also coupled to the signal source and provided for launching surface acoustic waves on the second surface. The surface acoustic waves launched by the second fan-shaped electrode in a second direction being focused to the apex of the pyramid. Further, the device includes a cutting stylus positioned on the apex. The cutting stylus exhibits vibratory motion in a direction parallel to the longitudinal axis in response to the surface acoustic waves focused to the apex. The pyramidal structure may have three, four or a plurality of sides other than the base.

Other features and advantages of the invention will be more fully understood from the following detailed description of the preferred embodiment, the appended claims and the accompanying drawing in which:

The energy in a surface acoustic wave (hereinafter, SAW) is propagated along the surface of a substrate within a layer of about one wavelength thickness. The novel device described herein makes use of the SAW focused to a small region on the surface of a substrate for use in mastering video discs.

The present invention relates to a stylus suitable for use in cutting topographic modulations into the surface of a record medium, for example, a disc-shaped video disc master substrate. Surface acoustic waves generated at video signal frequencies are excited at modest power density levels. The generated SAW are transmitted on the surface of the transducer and concentrated to high power densities of the tip of the transducer. The high intensity SAW focused at the tip drive a cutterhead (i.e., of diamond) in a vibratory state to cut (the mechanism may be a mechanical cutting, heating or a combination of mechanical cutting and heating) signal elements on the surface of the master substrate.

Most video disc systems have broad bandwidth. For example, in U.S. Pat. No. 3,842,194 issued on Oct. 15, 1974 to J. K. Clemens a broad bandwidth video disc system is disclosed. The Clemens patent discloses a video disc for use with a playback system of a variable capacitance type. In one configuration of the Clemens system, information representative of recorded picture and sound is included in the form of a relief pattern in a relatively fine spiral groove on the surface of a disc record. During playback, capacitance variations between a conductive electrode on a stylus and a conductive property of the disc record are sensed to recover the prerecorded information.

In one particularly successful format for the information track in practice of the Clemens invention, depressed areas extending across the groove bottom alternate with nondepressed areas. In accordance with this method an encoded video signal is additively combined with the accompanying encoded audio signal. The accompanying encoded audio signal is obtained by causing the audio signal to frequency modulate a low frequency sound carrier over a low frequency deviation range (illustratively, 716±50 KHz). The encoded video signal is obtained from a picture modulator wherein the composite color video signal (including luminance signals occupying the given band of frequencies and chrominance signals appearing as sideband components of a modulated chrominance subcarrier interleaved with the luminance signal components in an intermediate region of the given band) is caused to frequency modulate a high frequency picture carrier over a high frequency deviation range (illustratively, 4.3–6.3 MHz). The frequency spectrum of the encoded video signal in accordance with the aforementioned Clemens format includes a frequency deviation that ranges from 4.3 to 6.3 MHz with sideband which extend over the range from 2 to 9.3 MHz. Most of the energy of the spectrum is between 4.3 and 6.3 MHz.

Figure 1:
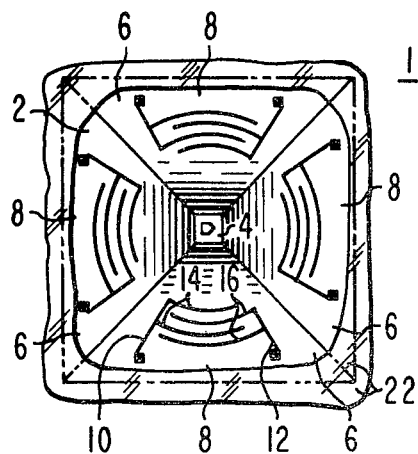
FIG. 1 is a plan view of a four-sided pyramidal-shaped surface acoustic wave device exhibiting a construction in accordance with the principles of the present invention.
Figure 2:
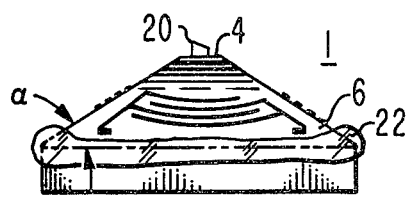
FIG. 2 is a side view of the pyramidal structure shown in FIG. 1.

Referring to FIG. 1, a plan view of SAW device 1 is illustrated. SAW device 1 comprises substrate 2 (i.e., acoustic medium) which, illustratively, may be formed of a piezoelectric material such as lithium niobate or single crystalline quartz. Non-piezoelectric materials such as metal or fused quartz can also be used if, in turn, the non-piezoelectric material is coated with a thin layer of piezoelectric material such as zinc oxide or PZT (PZT is a piezoelectric ceramic material of lead zirconium titanate manufactured by Clevite Co.). Referring to FIG. 2, a side view of SAW device 1 is shown. The tip 4 is formed in the shape of a pyramid having triangular-shaped sides 6. The side surfaces of the pyramid will be described herein as being triangular or pentagonal even though the pyramid apex, where the cutting stylus is mounted, is shown as flat and the side surfaces may, in fact, be four or six sided respectively. As shown in FIGS. 1 and 2 SAW device 1 has a pyramidal tip having four triangular-shaped surfaces 6. To excite SAW on the surface of substrate 2 a plurality (illustratively, 4) of multi-electrode interdigital transducers 8 are used. Transducers 8 are deposited on surfaces 6 of substrate 2 by techniques well-known in the SAW arts. Each transducer 8 includes two conductors 10 and 12 having fingers 14 and 16 respectively. The electrode fingers 14 and 16 are interdigitated to form pairs of interlocking conductors. Transducers 8 have electrode fingers 14 and 16 curved in a fan-shape such that SAW power launched from the transducers is focused at the apex of the pyramid. Illustratively, the device shown in FIGS. 1 and 2 is provided with two pairs of electrode fingers. The spacing between successive fingers of transducers 8 may be made equal to one-half of the wavelength of the signal which is to be applied. The frequency response depends mainly upon the space periodicity of the electrode finger array and the number of electrode finger pairs.

Positioned at the apex of the pyramidal-shaped structure is a cutting stylus 20 (e.g., of diamond). Cutting stylus 20 may be formed having various shapes such that the groove cut into a master substrate may take on several cross sectional shapes (e.g., trapezoidal, cusp, triangular). In one particularly successful format for video disc the groove cross sectional shape is triangular. In U.S. Pat. No. 4,035,590 issued on July 12, 1977 to J. B. Halter a cutting stylus is described for cutting a triangular groove into a metal master substrate for use in manufacturing video discs according to the Clemens format. Cutting stylus 20 is bonded, illustratively, using epoxy, to the apex of device 1.

In one format the pyramidal structure was formed having dimensions of 3.5×3.5×0.8 centimeters. In this particular format a slope angle α of 10 degrees was used.

In operation acoustic waves are launched from transducers 8, transmitted along the substrate surface and concentrated at the apex of the pyramidal-shaped device 1. Mechanical motion is imparted by the acoustic waves to cutterhead stylus 20. The high acoustic power concentration at stylus 20 necessary to form undulations on the surface of a record medium results from three factors: the inherent nature of the SAW to be confined within an acoustic wavelength of the substrate surface, the focusing effect of the curved electrodes of the fan-shaped transducers 8 and the SAW addition at the apex of the pyramid, which is common to the several sets of transducers.

Usually SAW transducers are bidirectional, i.e., SAW are launched from transducers 8 toward the apex of the pyramid and toward the base of the pyramid. The waves launched in the direction of the base are not generally useful and may, in fact, be reflected from the base to form spurious waves at the pyramid apex. For this reason, an absorber 22 is formed around the base of device 1 to absorb spurious SAW directed in a direction opposite to the apex. Illustratively, absorber 22 may be formed of silicon rubber which is effective in absorbing SAW.

Figure 3:
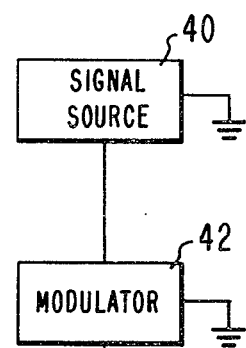
FIG. 3 is a representation, partially in block diagram form, of a SAW recording apparatus suitable for use in formation of an information record.
Figure 3:
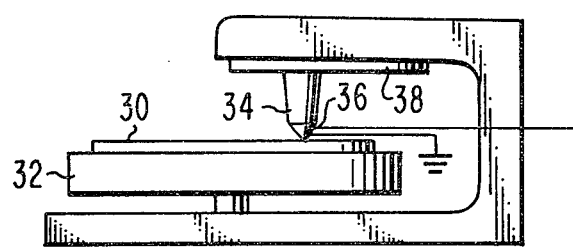

An explanation of the operation of a SAW device to cut undulations into a master substrate surface for use in video discs will now be provided with reference to FIG. 3. A master substrate 30 (illustratively, of copper) is placed on movable support 32 (i.e., turntable) in operating relationship with SAW cutterhead 36. SAW cutterhead 36 may be of a type described with reference to FIGS. 1 and 2. In this arrangement the support base of SAW cutterhead 36 may be attached to pedestal 54. The cutting stylus positioned on the end of cutterhead 36 is positioned with respect to master 30 in order to cut a groove having a quiescent groove depth of less than one micrometer while relative motion is established between substrate 30 and cutterhead 36. In one preferred arrangement, pedestal 34 is moved linearly on slide 38 while turntable 32 is rotated such that cutterhead 36 cuts a spiral groove in a disc-shaped substrate 30.

Video signals (along with accompanying audio signals) from a source 40 are applied via modulator 42 to cutterhead 36 to effect short wavelength modulation of the groove depth having a peak-to-peak displacement of less than the groove depth. In the record mode the power applied to cutterhead 36 is sufficient to effect a modulation of the groove depth representative of the information to be recorded.

After recording, the master substrate 30 has a relief pattern corresponding to that which is desired in the final record. Stampers which are used to produce production line records are made from the substrate and a vinyl record having the desired relief pattern for consumer use is formed from the stamper.

The recording stylus should have a flat, smooth frequency response over the frequency range of interest. With respect to a Clemens format, for example, that range extends up to about 10 MHz. The frequency response of the transducer consists of side lobes around a main lobe which is centered at the center frequency of the device. The center frequency of the device may be determined by the SAW velocity and the space periodicity of the transducer finger electrode array. The bandwidth of the main lobe of the frequency response is approximately 1/N where N is the number of electrode finger pairs. One of the simplest ways to obtain wide bandwidth operation for a SAW device is to have only one electrode pair. The problem with this approach, however, is that the generated SAW power is proportional to the square of N for a given length of the electrode finger and for a given voltage applied to the transducer electrode. Since the voltage is limited by the electrical breakdown between adjacent fingers, and, with respect to SAW type recording styli, the transducer dimensions are limited by the practical size of the pyramid, a single pair of fingers may not be adequate to obtain the high power concentration at the apex of the pyramid.

To obtain the wide frequency range necessary for SAW operation one may use the techniques described in two patent applications filed concurrently herewith. The first case was filed for M. Toda et al. entitled "Traveling Wave Type Surface Acoustic Wave Transducer." In accordance with this technique a delay line is used to broaden the bandwidth. Successive electrodes on the SAW device are driven by successive time delayed signals. The signal speed propagating along the delay line is chosen to be equal to the SAW propagation speed. In accordance with the other technique described in an application filed for M. Toda entitled, "Surface Acoustic Wave Cutterhead for Disc Recording Having a Circular Transducer," a plurality of transducers having varied finger electrode periodicity or having a plurality of finger number pairs is used. Since the periodicity of each transducer corresponds to a different center frequency, a plurality of transducers with overlapping main lobes provides a wide frequency response. When electrode pairs of different pair numbers are combined in a parallel arrangement the conversion loss is reduced for the overall structure.

One problem associated with SAW transducers is the interaction between facing transducers. Although each transducer in a pyramid structure may have a wide frequency response, the response characteristic may not be flat, i.e., an oscillatory response may appear that is caused by the mutual interaction of facing transducers. Referring to the structure of FIGS. 1 and 2 signals of SAW radiated from one transducer on one sloping surface of the pyramid may be picked up by the transducer on the opposite sloping surface. This interference affects the input driving signal. Since the phase of the output signal relative to the input signal depends upon the frequency and the distance between facing interacting transducers an oscillatory behavior may appear in the frequency response.

Figure 5:
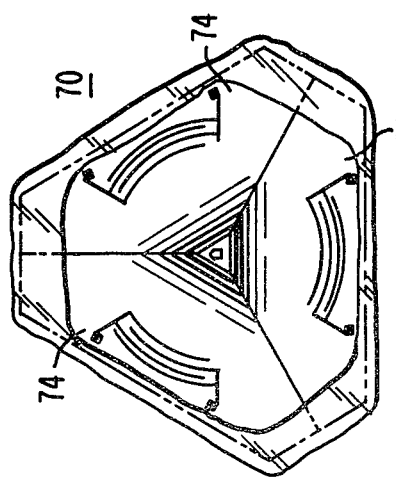
FIG. 5 is a plan view of a trunicated-triangular pyramidal structure for a SAW recording device exhibiting a construction in accordance with principles of the present invention.
Figure 6:
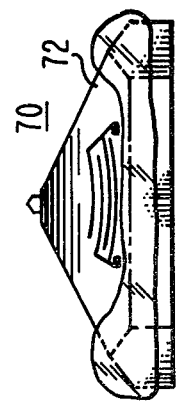
FIG. 6 is a side view of the pyramidal construction shown in FIG. 5.
Figure 4:
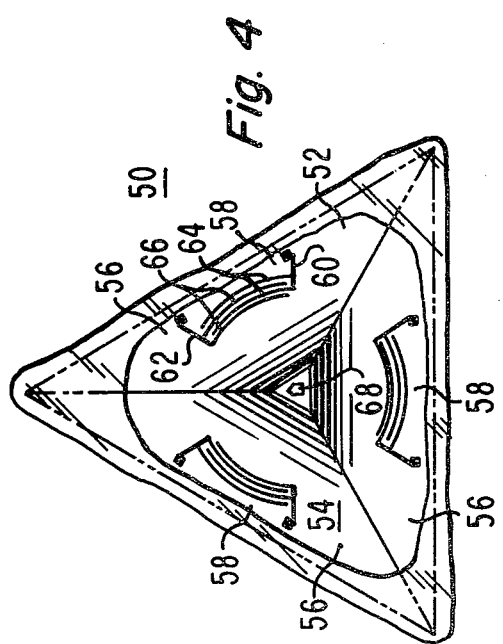
FIG. 4 is a plan view of a triangular pyramidal structure for a SAW recording device exhibiting a construction in accordance with the principles of the present invention.

Referring to FIGS. 4, 5 and 6 SAW device structures are shown that reduce the aforementioned problem associated with mutual interaction. A plan view of a SAW device 50 is illustrated in FIG. 4. The SAW device 50 comprises a substrate 52 (i.e., acoustic medium). The tip 54 of device 50 is formed in the shape of a triangular pyramid having triangular-shaped sides. A plurality of multi-electrode interdigital transducers 58 are deposited on surface 56 of substrate 52. Each transducer 50 includes two conductors 60 and 62 having fingers 64 and 66 respectively. Transducers 58 have electrode fingers 64 and 66 curved in a fan-shape such that SAW launched from the transducers is focused at the apex of the pyramid. Fixedly positioned at the apex of the pyramid is cutting stylus 68. Illustratively, fan-shaped transducers 58 have aperture angles of 60 degrees, are provided with three finger pairs and are formed having a center frequency $f_0$ of 3.8 MHz.

The mutual interaction between SAW transducers may be reduced by using a triangular (i.e., three-sided pyramid) structure. In this structure transducers do not face each other, i.e., no transducer is on the path of the SAW beam passing through the apex.

FIGS. 5 and 6 show plan and side views respectively of a SAW device 70. In this arrangement the oscillatory behavior of the device is reduced by incorporating a tip 72 being formed in the shape of a truncated pyramid having pentagonal-shaped side surfaces 74 which meet at the pyramid apex. The truncation is preformed for material volume and cost savings. Corners of a triangular pyramid have no effect on device function. A truncated-triangular pyramid may be cut from an ingot to provide a longer pyramid apex to edge distance. This gives effectively wider SAW propagation side surfaces of the pyramid, compared with those of a triangular one cut from the same ingot.

Figure 7:
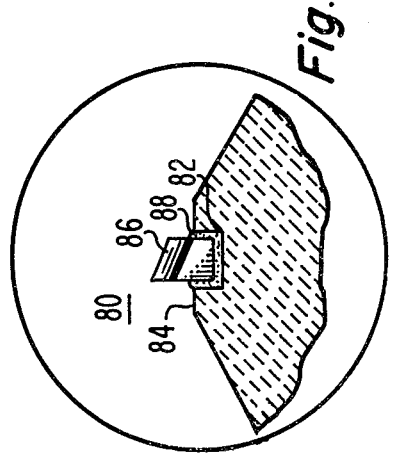
FIG. 7 is an enlarged partial side view of the tip of a SAW recording device exhibiting a construction in accordance with the principles of the present invention.

Referring to FIG. 7, an enlarged view of a portion of the tip of a pyramidal device 80 is shown. The cutterhead stylus 86 should be tightly bonded to the pyramid apex 84. Since the SAW propagation surface oscillates with a finite wavelength the bottom surface of the cutterhead 86 does not move in parallel with the surface of the pyramid apex 84. For this reason the adhesive bonding between the cutterhead 86 and the apex 84 may be mechanically stressed at the signal frequency. High frequency stress may weaken the bonding due to fatigue or heat generated in the adhesive or in the substrate. Further, the adhesive is subjected to a force during the recording operation. To reinforce the bonding, a small hole 82 is formed in the apex 84 of the pyramidal structure. Stylus 86 is placed into the small hole 82 and bonded with an adhesive 88 (illustratively, the adhesive 88 may be epoxy). If a metal, such as duralumin, is used as an acoustic medium the bonding may be made by swaging the stylus 86 into hole 82. A hole depth of a few tenths of the SAW wavelength should not seriously affect the vertical motion of the stylus 86.

Some electrical adjustment of the stylus position may be necessary. The stylus is preferably oscillated only in the vertical direction. This vertical motion is obtained for the stylus located at the SAW focal point. If the stylus mounting deviates from an optimal mounting point the stylus tip may oscillate elliptically with an undesired horizontal motion. This horizontal component may be cancelled by electrically adjusting the transducer position by phase shifting the incoming signal. The focal point is generally at the center of the transducer arrangement and the SAW signals generated from each transducer are in phase. If the phase of a signal applied to one transducer is shifted, a corresponding shift of the transducer geometrical position will take place. By electrically adjusting the transducer position the focusing point may be shifted to the actual stylus position. Correspondingly, variations in the transducer positioning on the sloping surfaces of the pyramid may be electrically adjusted by adjusting the phase of signals applied to the transducers.

While the principles of the present invention have been described with particular regard to the illustrations of the figures herein it will be recognized by those of skill in the art that various departures from such illustrated structures may be undertaken in practice of the invention. For example, the description herein has been described with reference to isotropic piezoelectric materials. For single crystal materials, such as lithium niobate, the crystalline orientation of the piezoelectric structure should be taken into account because the SAW propagation speed and the electromechanical coupling constant depend on the direction of propagation. For lithium niobate a Z-cut plate is convenient for forming the triangular pyramid structure because the crystal has three-fold symmetry about the Z-axis.

What is claimed is:

1. In a record system for recording information in the form of surface variations in a record medium, a surface acoustic wave device comprising:

a support having a pyramidal-shaped tip on one end thereof, said support having a longitudinal axis, said pyramidal-shaped tip including a plurality of polygon surfaces meeting at the apex of said pyramidal shape, said polygon surfaces being capable of supporting the propagation of surface acoustic waves;

a first fan-shaped electrode formed on a first surface of said plurality of polygon surfaces, said first fan-shaped electrode being coupled to a signal source and being provided for launching surface acoustic waves on said first surface, said surface acoustic waves launched from said first fan-shaped electrode in a first direction being focused at said apex;

a second fan-shaped electrode formed on a second surface of said plurality of polygon surfaces, said second fan-shaped electrode being coupled to said signal source and being provided for launching surface acoustic waves on said second surface, said surface acoustic waves launched from said second fan-shaped electrode in a second direction being focused at said apex; and a cutting stylus positioned on said apex, said cutting stylus exhibiting vibratory motion in a direction parallel to said longitudinal axis in response to said surface acoustic waves focused at said apex.

2. The device according to claim 1 wherein said plurality of polygon surfaces include pentagonal-shaped surfaces forming a three sided truncated pyramidal-shaped tip.

3. The device according to claim 1 wherein said first and second fan-shaped electrodes are interdigital transducers.

4. The device according to claim 3 wherein said first and second fan-shaped electrodes include at least two electrode finger pairs.

5. The device according to claim 1 wherein said polygon surfaces are triangular-shaped surfaces.

6. The device according to claim 5 wherein said plurality of triangular-shaped surfaces include three triangular-shaped surfaces forming a three sided pyramidal-shaped tip.

7. The device according to claim 1 further comprising:

a third fan-shaped electrode formed on a third surface of said plurality of polygon surfaces, said third fan-shaped electrode being coupled to said signal source and being provided for launching surface acoustic waves on said third surface, said surface acoustic waves launched from said third fan-shaped electrode being focused at said apex.

8. The device according to claim 7 wherein said first, second and third fan-shaped electrodes are interdigital transducers.

9. The device according to claim 8 wherein said first, second and third fan-shaped electrodes include at least two electrode finger pairs.

10. In a record system for recording information in the form of surface variations in a record medium, a surface acoustic wave device comprising:

a support having a tip formed in the shape of a truncated triangular pyramid, said support having a longitudinal axis, said tip having first, second and third pentagonal-shaped surfaces which meet at the apex of said pyramid, said pentagonal-shaped surfaces being capable of supporting the propagation of surface acoustic waves;

first, second and third fan-shaped electrodes, formed on said first, second and third pentagonal-shaped surfaces respectively, being connected in a parallel arrangement to a source of signals and being provided for launching surface acoustic waves on said pentagonal-shaped surfaces, said surface acoustic waves launched from said first, second and third electrodes being focused at said apex;

said apex of said pyramid having an aperture formed therein; and a cutting stylus exhibiting vibratory motion in a direction parallel to said axis in response to said surface acoustic waves focused at said apex, said cutting stylus being positioned on said apex in said aperture.

* * * * *